US011576077B2

(12) United States Patent
Liao

(10) Patent No.: US 11,576,077 B2
(45) Date of Patent: *Feb. 7, 2023

(54) METHOD FOR IMPROVING TRANSMISSION RATE IN MESH NETWORK

(71) Applicant: AMBIT MICROSYSTEMS (SHANGHAI) LTD., Shanghai (CN)

(72) Inventor: Peng-Yu Liao, New Taipei (TW)

(73) Assignee: AMBIT MICROSYSTEMS (SHANGHAI) LTD., Shanghai (CN)

(*) Notice: Subject to any disclaimer, the term of this patent is extended or adjusted under 35 U.S.C. 154(b) by 64 days.

This patent is subject to a terminal disclaimer.

(21) Appl. No.: 17/195,912

(22) Filed: Mar. 9, 2021

(65) Prior Publication Data

US 2021/0195464 A1 Jun. 24, 2021

Related U.S. Application Data

(63) Continuation of application No. 16/507,311, filed on Jul. 10, 2019, now Pat. No. 10,993,143.

(51) Int. Cl.
*H04B 7/0404* (2017.01)
*H04B 7/0408* (2017.01)
(Continued)

(52) U.S. Cl.
CPC .......... *H04W 28/06* (2013.01); *H04B 7/0404* (2013.01); *H04B 7/0408* (2013.01);
(Continued)

(58) Field of Classification Search
CPC ..... H04B 7/02–17; H04B 17/0082–409; H04J 11/0023–0093;
(Continued)

(56) References Cited

U.S. PATENT DOCUMENTS 10,993,143 B2 * 4/2021 Liao ....................... H04W 28/06
2012/0259992 A1 * 10/2012 Koehler ................. H04W 76/12
(Continued)

FOREIGN PATENT DOCUMENTS

WO 2018223794 A1 12/2018

*Primary Examiner* — Timothy J Weidner
(74) *Attorney, Agent, or Firm* — ScienBiziP, P.C.

(57) ABSTRACT

A client terminal sends a signal to a wireless access device. The wireless access device receives the signal, determines channel state information corresponding to the client terminal according to identity information of the client terminal in the signal, and calculates data sent by the client terminal according to the channel state information and the signal. The client terminal sends a request signal for acquiring channel state information, wherein the request signal includes identity information of the client terminal. The wireless access device receives the request signal, obtains the channel state information corresponding to the client terminal according to the identity information of the client terminal in the request signal, and sends the obtained channel state information to the client terminal. The client terminal receives the channel state information and the signal and calculates the data sent to the client terminal according to the channel state information and the signal.

9 Claims, 7 Drawing Sheets

(51) Int. Cl.
| | |
|---|---|
| *H04B 7/0413* | (2017.01) |
| *H04B 17/318* | (2015.01) |
| *H04B 17/373* | (2015.01) |
| *H04B 17/382* | (2015.01) |
| *H04L 5/00* | (2006.01) |
| *H04W 24/02* | (2009.01) |
| *H04W 28/02* | (2009.01) |
| *H04W 28/06* | (2009.01) |
| *H04W 72/04* | (2009.01) |
| *H04W 72/06* | (2009.01) |
| *H04W 72/08* | (2009.01) |
| *H04W 72/12* | (2009.01) |
| *H04W 84/18* | (2009.01) |
| *H04W 88/02* | (2009.01) |
| *H04W 88/04* | (2009.01) |
| *H04W 88/08* | (2009.01) |
| *H04W 92/02* | (2009.01) |
| *H04W 92/10* | (2009.01) |

(52) U.S. Cl.
CPC ......... *H04B 7/0413* (2013.01); *H04B 17/318* (2015.01); *H04B 17/373* (2015.01); *H04B 17/382* (2015.01); *H04L 5/0035* (2013.01); *H04L 5/0064* (2013.01); *H04L 5/0094* (2013.01); *H04W 24/02* (2013.01); *H04W 28/0205* (2013.01); *H04W 28/0231* (2013.01); *H04W 72/048* (2013.01); *H04W 72/06* (2013.01); *H04W 72/08* (2013.01); *H04W 72/121* (2013.01); *H04W 72/1226* (2013.01); *H04W 72/1247* (2013.01); *H04W 84/18* (2013.01); *H04W 88/02* (2013.01); *H04W 88/04* (2013.01); *H04W 88/08* (2013.01); *H04W 92/02* (2013.01); *H04W 92/10* (2013.01)

(58) Field of Classification Search
CPC .... H04J 2011/0003–0096; H04L 1/0001–248; H04L 5/003–0098; H04W 8/22–245; H04W 24/02–10; H04W 28/02–26; H04W 36/0005–385; H04W 40/005–38; H04W 48/02–20; H04W 72/005–14; H04W 74/002–0891; H04W 76/10–50; H04W 84/005–22; H04W 88/005–188; H04W 92/02; H04W 92/04; H04W 92/10; H04W 92/12; H04W 92/16–22
See application file for complete search history.

(56) References Cited

U.S. PATENT DOCUMENTS

| | | |
|---|---|---|
| 2014/0112406 A1 | 4/2014 | Zhu |
| 2020/0145154 A1 | 5/2020 | Black et al. |
| 2020/0404554 A1* | 12/2020 | Nishiyasu ............. H04W 48/14 |

* cited by examiner

000
METHOD FOR IMPROVING TRANSMISSION RATE IN MESH NETWORK

CROSS REFERENCE TO RELATED APPLICATIONS

This application is a Continuation of pending U.S. patent application Ser. No. 16/507,311, filed on Jul. 10, 2019 and entitled "METHOD FOR IMPROVING TRANSMISSION RATE IN MESH NETWORK", the entirety content of which is incorporated by reference herein.

FIELD

The subject matter herein generally relates to mesh networks, and more particularly to a method for improving a transmission rate in a mesh network.

BACKGROUND

At present, wireless access devices in existing mesh networks generally allow only one wireless network device to transmit data within the same signal range and within the same time period. Therefore, the overall transmission rate of the existing mesh network is not high.

BRIEF DESCRIPTION OF THE DRAWINGS

Implementations of the present disclosure will now be described, by way of embodiments, with reference to the attached figures.

DETAILED DESCRIPTION

Figure 1:
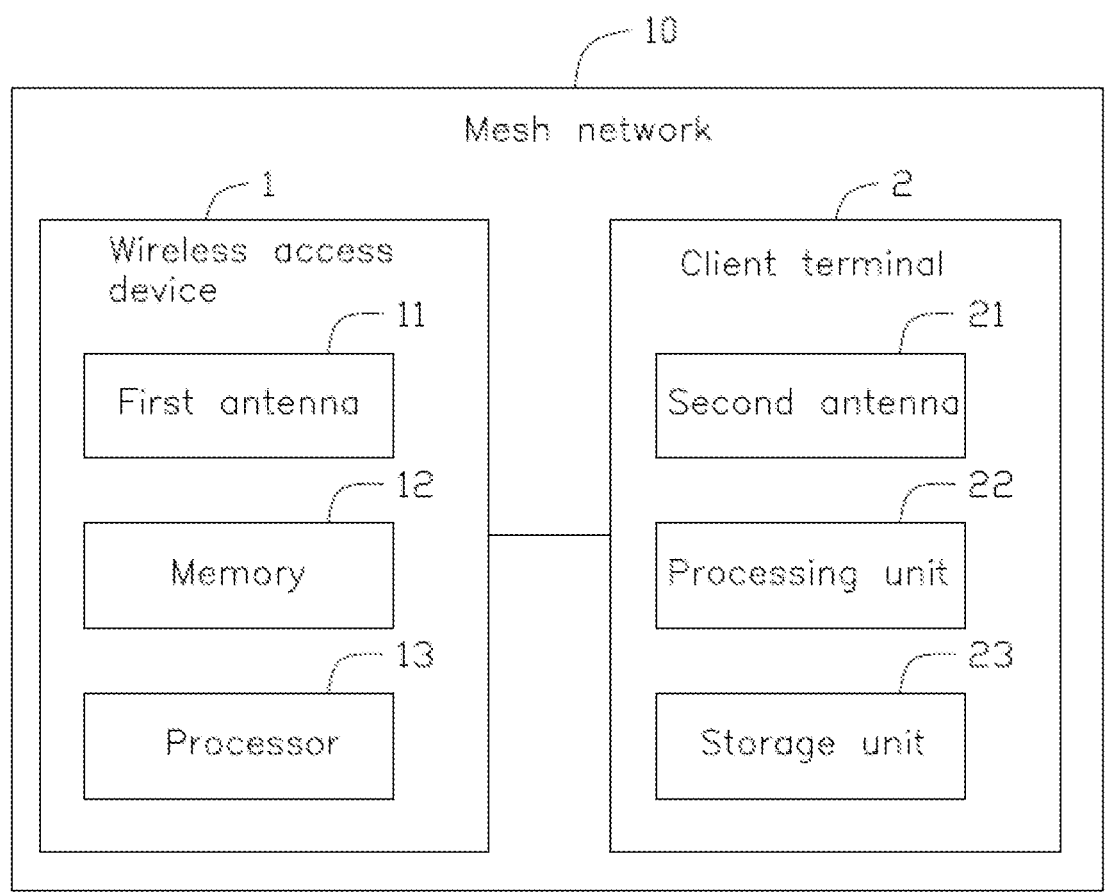
FIG. 1 is a schematic block diagram of an embodiment of a mesh network.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a schematic block diagram of an embodiment of a mesh network 10. The mesh network 10 includes at least one wireless access device 1 and at least one client terminal 2. The wireless access device 1 transmits a signal to the client terminal 2 or receives a signal transmitted by the client terminal 2. In one embodiment, the wireless access device 1 may be a wireless router, and the client terminal 2 may be a notebook computer, a mobile phone, or a tablet computer.

In one embodiment, the wireless access device 1 includes a first antenna 11, a memory 12, and a processor 13. The wireless access device 1 forwards signals to the client terminal 2 in the mesh network 10 via the first antenna 11 or receives signals transmitted by the client terminal 2 in the mesh network 10 via the first antenna 11. In one embodiment, the wireless access device 1 includes multiple first antennas 11, and a quantity of the first antennas 11 is not less than a quantity of the client terminals 2 in the mesh network 10. In one embodiment, the quantity of first antennas 11 determines the quantity of client terminals 2 that can simultaneously perform data transmission in the mesh network 10. The processor 13 controls the wireless access device 1 to forward signals to the client terminal 2 or receive signals transmitted by the client terminal 2.

In one embodiment, the processor 13 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 13 may be a microprocessor or other processor known in the art.

In one embodiment, the memory 12 stores data and/or software programs. The memory 12 may be an internal storage unit in the wireless access device 1, such as a hard disk or memory in the wireless access device 1. In another embodiment, the memory 12 may be an external storage device in the wireless access device 1, such as a plug-in hard disk provided on the wireless access device 1, a smart memory card (SMC), Secure Digital (SD) card, Flash Card, or the like.

In one embodiment, the client terminal 2 includes a second antenna 21, a processing unit 22, and a storage unit 23. In one embodiment, the client terminal 2 communicates with the wireless access device 1 through the second antenna 21. In one embodiment, the second antenna 21 may be a WIFI antenna. That is, the client terminal 2 receives a signal sent by the wireless access device 1 through a WIFI communication module or sends a signal to the wireless access device 1 through a WIFI communication module. In one embodiment, the processing unit 22 controls the client terminal 2 to send or receive a signal. In one embodiment, the processing unit 22 may be a central processing unit (CPU), a microprocessor, or other data processing chip. The storage unit 23 stores data and/or software programs. For example, the storage unit 23 may store a signal transmitted by the wireless access device 1. In one embodiment, the storage unit 23 may be an internal storage unit in the client terminal 2, such as a hard disk or a memory in the client terminal 2. In another embodiment, the storage unit 23 may be an external storage device in the client terminal 2, such as a plug-in hard disk provided on the client terminal 2, an SMC, an SD card, a Flash Card, or the like.

Figure 2:
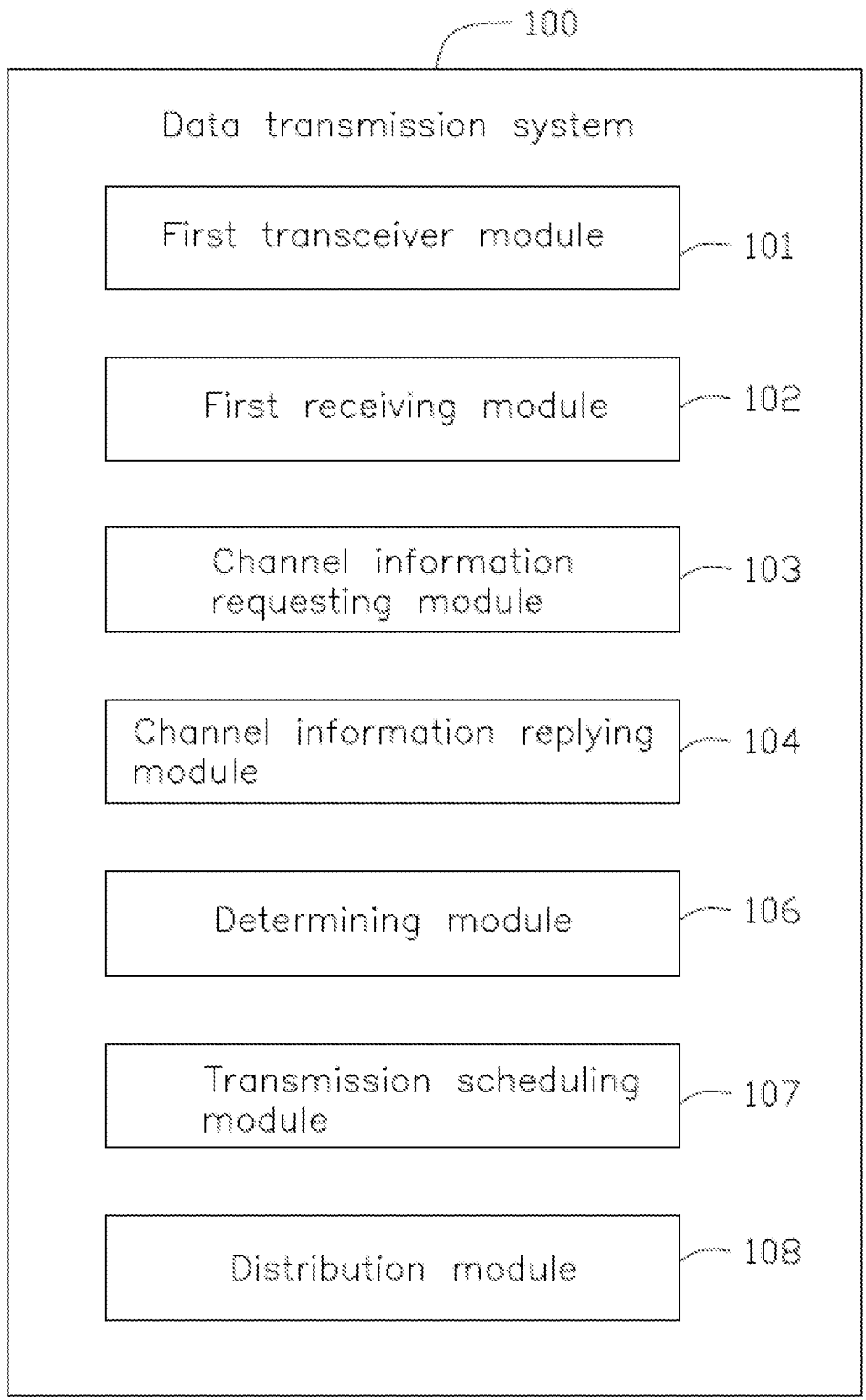
FIG. 2 is a schematic block diagram of a data transmission system implemented in a wireless access device and a client terminal in the mesh network.

FIG. 2 is a block diagram of an embodiment of a data transmission system 100. In one embodiment, the data transmission system 100 includes one or more modules, which operate in the wireless access device 1 and the client terminal 2. In one embodiment, the data transmission system 100 includes a first transceiver module 101, a first receiving module 102, a channel information requesting module 103, a channel information replying module 104, a determining module 106, a transmission scheduling module 107, and an distribution module 108.

In one embodiment, the first transceiver module 101, the channel information requesting module 103, the determining module 106, and the transmission scheduling module 107 are stored in the storage unit 23 of the client terminal 2 and executed by the processing unit 22. The first receiving module 102, the channel information replying module 104, and the distribution module 108 are stored in the memory 12 of the wireless access device 1 and executed by the processor 13.

The first transceiver module 101 is executed in the client terminal 2 for transmitting a signal carrying identity information of the client terminal 2 to the wireless access device 1.

In one embodiment, the first transceiver module 101 sends a signal carrying the identity information of the client terminal 2 to the wireless access device 1 through the second antenna 21. In one embodiment, the identity information of the client terminal 2 may be a unique number of the client terminal 2, and the unique number may be composed of characters such as letters or numbers.

The first receiving module 102 is executed in the wireless access device 1 for receiving, via the first antenna 11, a signal sent by at least one client terminal 2, determining channel state information (CSI) corresponding to the client terminal 2 according to the identity information of the client terminal 2 in the signal, and calculating data sent by each client terminal 2 according to the determined channel state information and the signal sent by each client terminal 2.

In one embodiment, the channel state information describes a attenuation factor of a transmission signal along a transmission path between the client terminal 2 and each of the first antennas 11 of the wireless access device 1.

Figure 3:
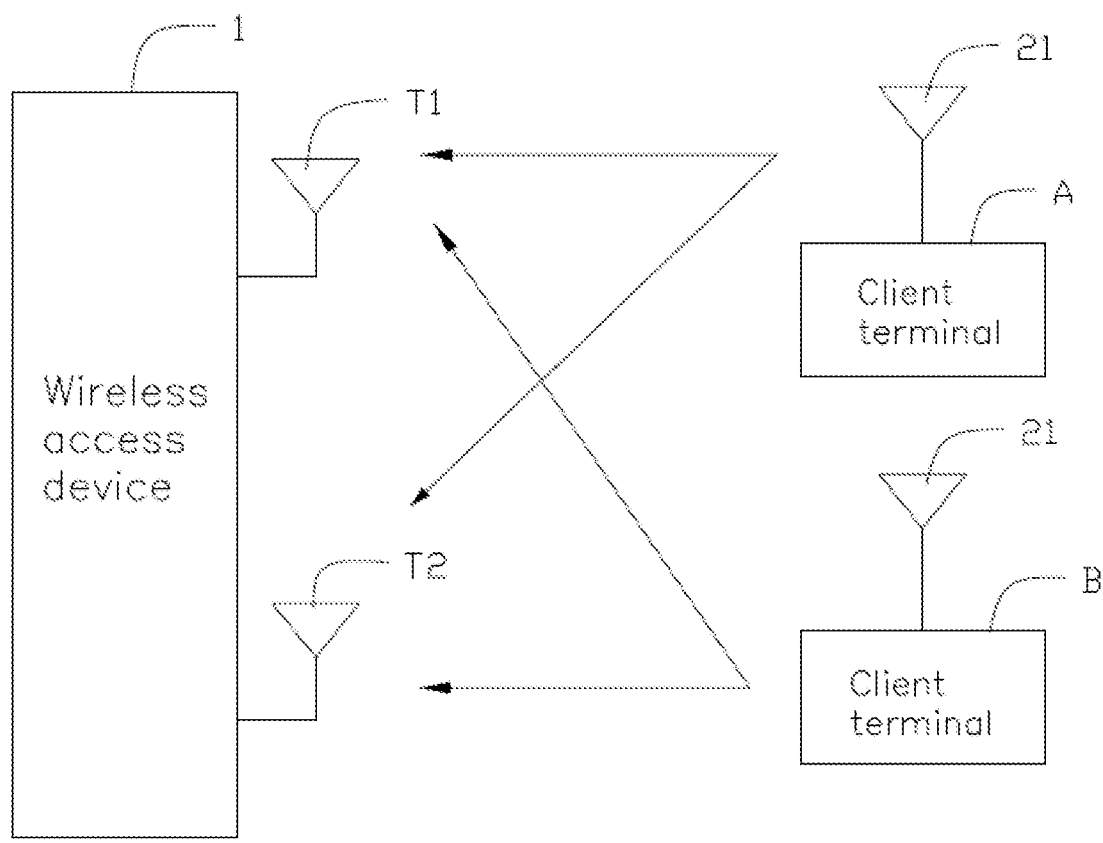
FIG. 3 is a schematic diagram of the wireless access device receiving signals sent by two client terminals.

FIG. 3 shows a schematic diagram of the wireless access device 1 receiving signals sent by two client terminals 2. In one embodiment, the wireless access device 1 includes two first antennas 11, each of which is communicatively coupled to two client terminals 2. For convenience of description, the two first antennas 11 are respectively referred to as a first antenna T1 and a first antenna T2, and the two client terminals 2 are respectively referred to as a client terminal A and a client terminal B. In one embodiment, both the client terminal A and the client terminal B can send a signal to the wireless access device 1, and the wireless access device 1 receives the signals sent by the client terminal A and the client terminal B through the first antenna T1 and the first antenna T2. The data sent by the client terminal A to the wireless access device 1 is set as x, and the data sent by the client terminal B to the wireless access device 1 is set as y. The signal received by the first antenna T1 from the client terminal A and the client terminal B is set as S1, and the signal received by the first antenna T2 from the client terminal A and the client terminal B is set as S2. The first receiving module 102 determines, with a driver in the wireless access device 1, the channel state information corresponding to the client terminal A as a vector $$h_1 = \begin{bmatrix} h_{A1} \\ h_{A2} \end{bmatrix}$$

according to the identity information in the signal sent by the client terminal A, wherein $h_{A1}$ is the attenuation factor of a transmission signal along a transmission path between the client terminal A and the first antenna T1, and $h_{A2}$ is the attenuation factor of a transmission signal along a transmission path between the client terminal A and the first antenna T2. The first receiving module 102 further determines, with the driver in the wireless access device 1, the channel state information corresponding to the client terminal B as a vector $$h_2 = \begin{bmatrix} h_{B1} \\ h_{B2} \end{bmatrix}$$

according to the identity information in the signal sent by the client terminal B, wherein $h_{B1}$ is the attenuation factor of a transmission signal along a transmission path between the client terminal B and the first antenna T1, and $h_{B2}$ is the attenuation factor of a transmission signal along a transmission path between the client terminal B and the first antenna T2.

The first receiving module 102 calculates, according to the determined channel state information $$h_1 = \begin{bmatrix} h_{A1} \\ h_{A2} \end{bmatrix} \text{ and } h_2 = \begin{bmatrix} h_{B1} \\ h_{B2} \end{bmatrix}$$

and the signals S1 and S2 received by the first antennas T1 and T2, the data x sent by the client terminal A and the data y sent by the client terminal B according to the equations $$\begin{cases} h_{A1} \cdot x + h_{B1} \cdot y = S1 \\ h_{A2} \cdot x + h_{B2} \cdot y = S2 \end{cases}.$$

In this way, the wireless access device 1 receives the data synchronously transmitted by the client terminal A and the client terminal B, thereby implementing uplink synchronous transmission of the wireless access device 1.

The channel information requesting module 103 is executed in the client terminal 2 and sends a request signal for acquiring channel state information, wherein the request signal includes identity information of the client terminal 2.

In one embodiment, the request signal is sent through the second antenna 21 to the wireless access device 1.

The channel information replying module 104 is executed in the wireless access device 1 and receives the request signal sent by the client terminal 2, obtains the corresponding channel state information corresponding to the client terminal 2 according to the identity information of the client terminal 2 in the request signal, and sends the obtained channel state information to the client terminal 2.

In one embodiment, the channel state information corresponding to the client terminal 2 is acquired by the driver in the wireless access device 1.

The first transceiver module 101 receives the channel state information sent by the wireless access device 1 and the signal sent by the wireless access device 1 to the client terminal 2, and calculates the data sent by the first antenna 11 to the client terminal 2 according to the channel state information and the signal.

Figure 4:
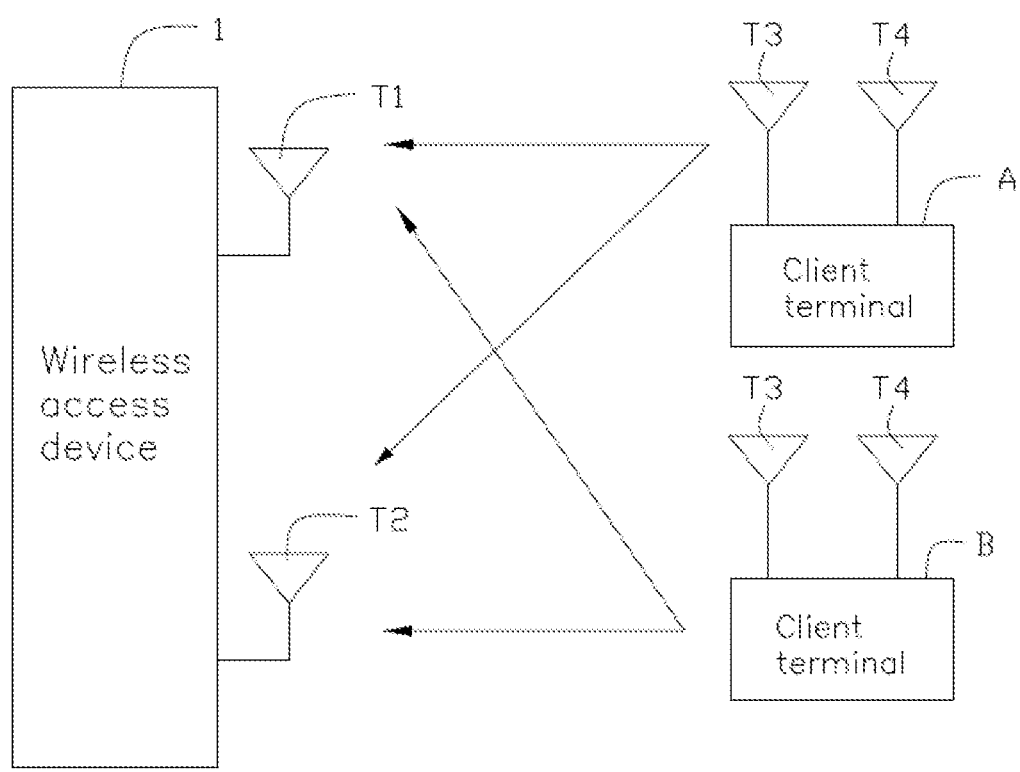
FIG. 4 is a schematic diagram of the wireless access device sending signals to two client terminals.

FIG. 4 shows a schematic diagram of the wireless access device 1 sending signals to two client terminals 2. In one embodiment, the wireless access device 1 includes two first antennas 11, each of which is in communication with two client terminals 2, and each client terminal 2 includes two second antennas 21. The data transmitted by the wireless access device 1 through the two first antennas 11 is respectively received by the two second antennas 21 of each client terminal 2.

For convenience of description, the two first antennas 11 are respectively referred to as a first antenna T1 and a first antenna T2, and the two client terminals 2 are respectively referred to as client terminal A and client terminal B. The two second antennas 21 are respectively referred to as a second antenna T3 and a second antenna T4. In one embodiment, the wireless access device 1 transmits data to the client terminal A and the client terminal B through the first antenna T1 and the first antenna T2, and the client terminal A and the client terminal B each receive the data through the second antenna T3 and the second antenna T4. Data sent by the first antenna T1 to the client terminal A and the client terminal B is set as a1 and a2, respectively, and data sent by the second antenna T2 to the client terminal A and the client terminal B is set as b1 and b2, respectively. A signal received from the wireless access device 1 by the second antenna T3 of the client terminal A is set as S3, a signal received from the wireless access device 1 by the second antenna T4 of the client terminal A is set as S4, a signal received from the wireless access device 1 by the second antenna T3 of the client terminal B is set as S5, and a signal received from the wireless access device 1 by the second antenna T4 of the client terminal B is set as S6.

The channel information replying module 104 determines, with a driver in the wireless access device 1, the channel state information corresponding to the client terminal A as a vector $$h_3 = \begin{bmatrix} h_{A3}, h_{A5} \\ h_{A4}, h_{A6} \end{bmatrix}$$

according to the identity information in the signal sent by the client terminal A, wherein $h_{A3}$ is the attenuation factor of a transmission signal along a transmission path between the second antenna T3 of the client terminal A and the first antenna T1, $h_{A4}$ is the attenuation factor of a transmission signal along a transmission path between the second antenna T3 of the client terminal A and the first antenna T2, $h_{A5}$ is the attenuation factor of a transmission signal along a transmission path between the second antenna T4 of the client terminal A and the first antenna T1, and $h_{A6}$ is the attenuation factor of a transmission signal along a transmission path between the second antenna T4 of the client terminal A and the first antenna T2.

The channel information replying module 104 further determines, with the driver in the wireless access device 1, the channel state information corresponding to the client terminal B as a vector $$h_4 = \begin{bmatrix} h_{B3}, h_{B5} \\ h_{B4}, h_{B6} \end{bmatrix}$$

according to the identity information in the signal sent by the client terminal B, wherein $h_{B3}$ is the attenuation factor of a transmission signal along a transmission path between the second antenna T3 of the client terminal B and the first antenna T1, $h_{B4}$ is the attenuation factor of a transmission signal along a transmission path between the second antenna T3 of the client terminal B and the first antenna T2, $h_{B5}$ is the attenuation factor of a transmission signal along a transmission path between the second antenna T4 of the client terminal B and the first antenna T1, and $h_{B6}$ is the attenuation factor of a transmission signal along a transmission path between the second antenna T4 of the client terminal B and the first antenna T2.

The first transceiver module 101 receives the channel state information $$h_3 = \begin{bmatrix} h_{A3}, h_{A5} \\ h_{A4}, h_{A6} \end{bmatrix}$$

sent by the wireless access device 1 and the signals S3, S4 sent by the wireless access device 1 to the second antennas T3, T4 of the client terminal A, and calculates the data a1 sent by the first antenna T1 to the client terminal A and the data b1 sent by the first antenna T2 to the client terminal A according to the equations $$\begin{cases} h_{A3} \cdot a_1 + h_{A4} \cdot b_1 = S3 \\ h_{A5} \cdot a_1 + h_{A6} \cdot b_1 = S4 \end{cases}.$$

The first transceiver module 101 receives the channel state information $$h_4 = \begin{bmatrix} h_{B3}, h_{B5} \\ h_{B4}, h_{B6} \end{bmatrix}$$

sent by the wireless access device 1 and the signals S5, S6 sent by the wireless access device 1 to the second antennas T3, T4 of the client terminal B, and calculates the data a2 sent by the first antenna T1 to the client terminal B and the data b2 sent by the first antenna T2 to the client terminal B according to the equations $$\begin{cases} h_{B3} \cdot a_2 + h_{B4} \cdot b_2 = S5 \\ h_{B5} \cdot a_2 + h_{B6} \cdot b_2 = S6 \end{cases}.$$

In this way, the wireless access device 1 transmits the data synchronously to the client terminal A and the client terminal B, thereby implementing downlink synchronous transmission of the wireless access device 1.

The determining module 106 is executed in the client terminal 2 and determines the wireless access device 1 that establishes a communication connection with the client terminal 2 as a target device. The determining module 106 further detects whether the client terminal 2 is within a communication range of another wireless access device 1. If the client terminal 2 is within a communication range of another wireless access device 1, the another wireless access device 1 is determined as an interference device.

When an interference device is present, the first transceiver module 101 acquires channel state information sent by the target device, monitors channel state information sent by the interference device, and calculates a precoding matrix according to the channel state information sent by the target device and the channel state information sent by the interference device. The first transceiver module 101 performs diversity processing on the signal sent to the target device according to the precoding matrix to determine a first beam sent by the client terminal 2 to the target device, performs null processing on the signal sent to the interference device according to the precoding matrix to determine a second beam sent by the client terminal 2 to the interference device, and controls the client terminal 2 to send a signal to the target device through the first beam and send a signal to the interference device through the second beam to prevent the interference device from receiving interference from signals sent by the client terminal 2.

In one embodiment, the first transceiver module 101 calculates the precoding matrix according to the channel state information sent by the target device and the channel state information sent by the interference device by determining a first channel state vector according to the channel state information sent by the interference device, calculating a null space of the first channel state vector, determining a second channel state vector according to the channel state information sent by the target device, and projecting the second channel state vector in the null space to obtain the precoding matrix.

When the interference device is not present, the first transceiver module 101 acquires the channel state information sent by the target device, calculates a precoding matrix according to the channel state information sent by the target device, performs diversity processing on the signal sent to the target device according to the precoding matrix to determine a first beam transmitted by the client terminal 2 to the target device, and controls the client terminal 2 to send the signal through the first beam to the target device.

In one embodiment, the mesh network 100 includes a plurality of wireless access devices 1, each of which is in communication with at least one client terminal 2. The plurality of wireless access devices 1 are in communication with each other. The first transceiver module 101 is further configured to send an information transmission request of the client terminal 2 to each wireless access device 1. The first receiving module 102 controls the wireless access device 1 to receive the information transmission request sent by the client terminal 2 and determines a transmission plan for information transmission between the wireless access device 1 and the client terminal 2 according to the information transmission request. The first receiving module 102 receives the transmission plans from the other wireless access devices 1 for information transmission between the other wireless access devices 1 and the client terminals 2 and sorts the transmission plans of all the wireless access devices 1 in the mesh network 100. The first receiving module 102 further sends the transmission plan of all the wireless access devices 1 in the mesh network 100 to the client terminals 2. In one embodiment, the transmission plan includes a relationship between the wireless access devices 1 and the client terminals 2 and a time schedule for the client terminals 2 or the wireless access devices 1 to perform information transmission.

After receiving the transmission plan of all the wireless access devices 1 in the mesh network 100, the determining module 106 determines a target device communicatively coupled to the client terminal 2 according to the transmission plans and determines whether the client terminal 2 is within a communication range of another wireless communication device 1 besides the target device. If the client terminal 2 is within a communication range of another wireless communication device 1 besides the target device, the determining module 106 determines the another wireless communication device 1 as an interference device.

The transmission scheduling module 107 is executed in the client terminal 2 and performs information transmission with the wireless access devices 1 according to the transmission plans of all the wireless access devices 1 in the mesh network 100. In one embodiment, since the wireless access device 1 transmits the sorted transmission plans of all the wireless access devices 1 in the mesh network 100 to the client terminal 2 coupled to the wireless access device 1, the transmission scheduling module 107 performs information transmission with the wireless access device 1 according to the transmission plan sent by the wireless access device 1. In one embodiment, the transmission scheduling module 107 further determines, according to the transmission plan sent by the wireless access device 1, a time when the client terminal 2 and the wireless access device 1 perform information transmission, and a time when no information is transmitted, and controls the client terminal 2 to sleep during the time when the information is not transmitted, thereby achieving the effect of saving power.

The distribution module 108 is executed in the wireless access device 1 for allocating the number of client terminals 2 connected to the wireless access device 1 in the mesh network 100 according to a preset mechanism.

For convenience of description, in the present embodiment, a wireless access device 1 in the mesh network 100 is referred to as a first wireless access device, and the wireless access devices 1 in the mesh network 100 other than the first wireless access device are referred to as second wireless access devices. In one embodiment, the preset mechanism is to evenly allocate the number of client terminals 2 connected to the wireless access devices 1 in the mesh network 100. Specifically, the distribution module 108 establishes a first connection list of the client terminals 2 that are communicatively coupled to the first wireless access device, and establishes a first detection list of the client terminals 2 that are not communicatively coupled to the first wireless access device but are within a communication range of the first wireless access device. The distribution module 108 further establishes a second connection list of the client terminals 2 that are communicatively coupled to the second wireless access device, and establishes a second detection list of the client terminals 2 that are not communicatively coupled to the second wireless access device but are within a communication range of the second wireless access device. The distribution module 108 determines whether the numbers of the client terminals 2 in the first connection list and in the second connection list are the same. When it is determined that the numbers of the client terminals 2 in the first connection list and in the second connection list are different, and the number of the client terminals 2 in the first connection list is greater than the number of the client terminals 2 in the second connection list, the distribution module 108 filters out the client terminal 2 that are included simultaneously in the first connection list and in the second detection list as target client terminals and controls the first wireless access device to open an access control list (ACL) to disconnect communication with the target client terminals. The distribution module 108 further controls the second wireless access device to open an access control list to connect the second wireless access device with the target client terminals.

In one embodiment, the allocation module 108 determines the number of target client terminals that are filtered out. When the number of target client terminals exceeds one, the distribution module 108 calculates a score of each target client terminal according to an information transmission rate between each target client terminal and the first wireless access device and according to a signal strength of each target client terminal acquired by the second wireless access device. The target client terminal with the highest score is set as a target client terminal to be allocated, the first wireless access device is controlled to open the access control list to disconnect the target client terminal to be allocated, and the second wireless access device is controlled to open the access control list to connect the second wireless access device to the target client terminal to be allocated.

In one embodiment, the distribution module 108 calculates a score of each target client terminal by first grouping the target client terminals into target client terminals to be scored and target client terminals not to be scored. A score of each target client terminal not to be scored is determined according to an information transmission rate between the target client terminal not to be scored and the first wireless access device. Then, a score of each target client terminal to be scored is determined according to a signal strength of the target client terminal to be scored acquired by the second wireless access device. Then, the score of each target client terminal not to be scored is added to the score of each target client terminal to be scored to obtain a score of the target client terminal to be scored.

Figure 5:
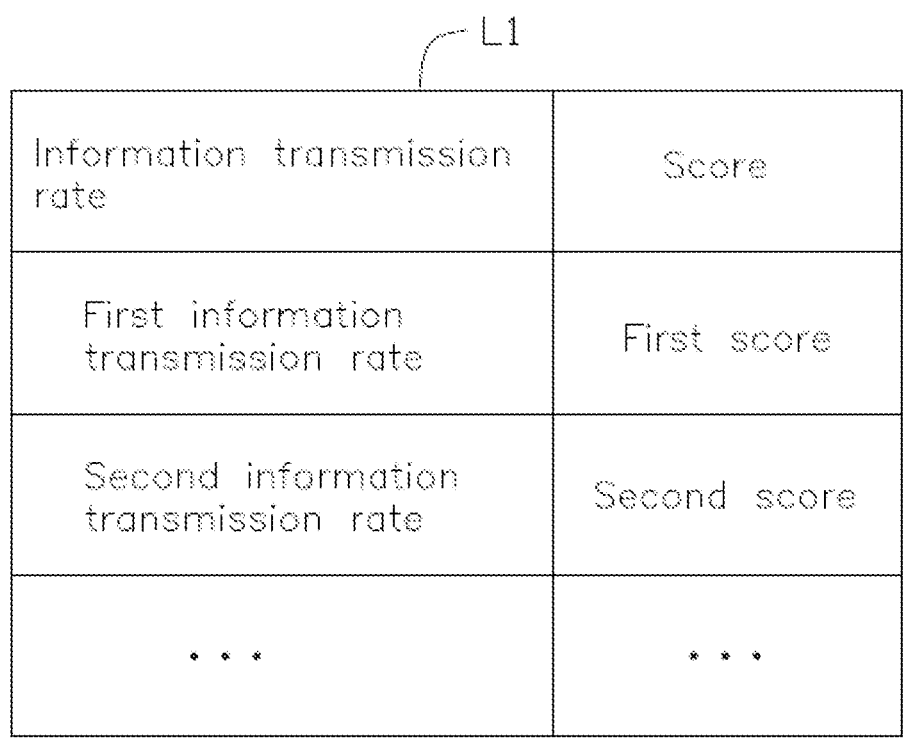
FIG. 5 is a schematic diagram of a first relationship table defining a relationship between an information transmission rate of the client terminal with the wireless access device and a score.

FIG. 5 shows a schematic diagram of a first relationship table L1, which is stored in the wireless access device 1. The first relationship table L1 defines a relationship between an information transmission rate of the client terminal 2 with the wireless access device 1 and a score. In one embodiment, the distribution module 108 searches the first relationship table L1 according to the information transmission rate between each target client terminal not to be scored and the first wireless access device, and determines the score corresponding to the information transmission rate.

Figure 6:
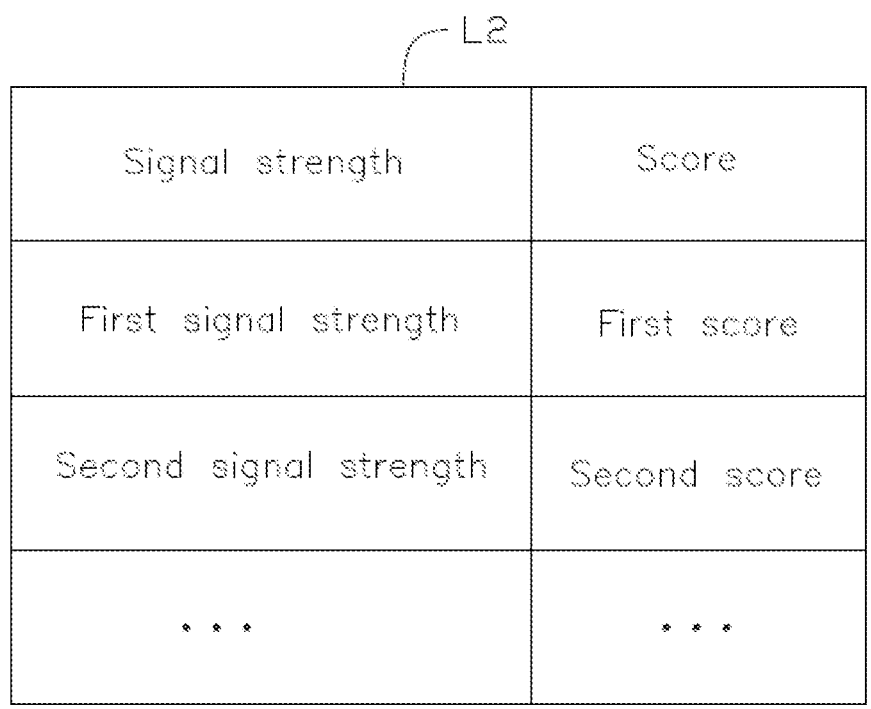
FIG. 6 is a schematic diagram of a second relationship table defining a relationship between a signal strength of the client terminal and a score.

FIG. 6 shows a schematic diagram of a second relationship table L2, which is stored in the wireless access device 1. The second relationship table L2 defines a relationship between the signal strength of the client terminal 2 and a score. In one embodiment, the distribution module 108 searches the second relationship table L2 according to the signal strength of the target client terminal to be scored acquired by the second wireless access device and determines the score of the target client terminal to be scored corresponding to the signal strength.

In another embodiment, the preset mechanism is to assign the client terminal 2 having a high priority to the wireless access device 1 in the mesh network 100 being connected to a least amount of client terminals 2. In one embodiment, the priority of the client terminals 2 can be set in advance.

Figure 7:
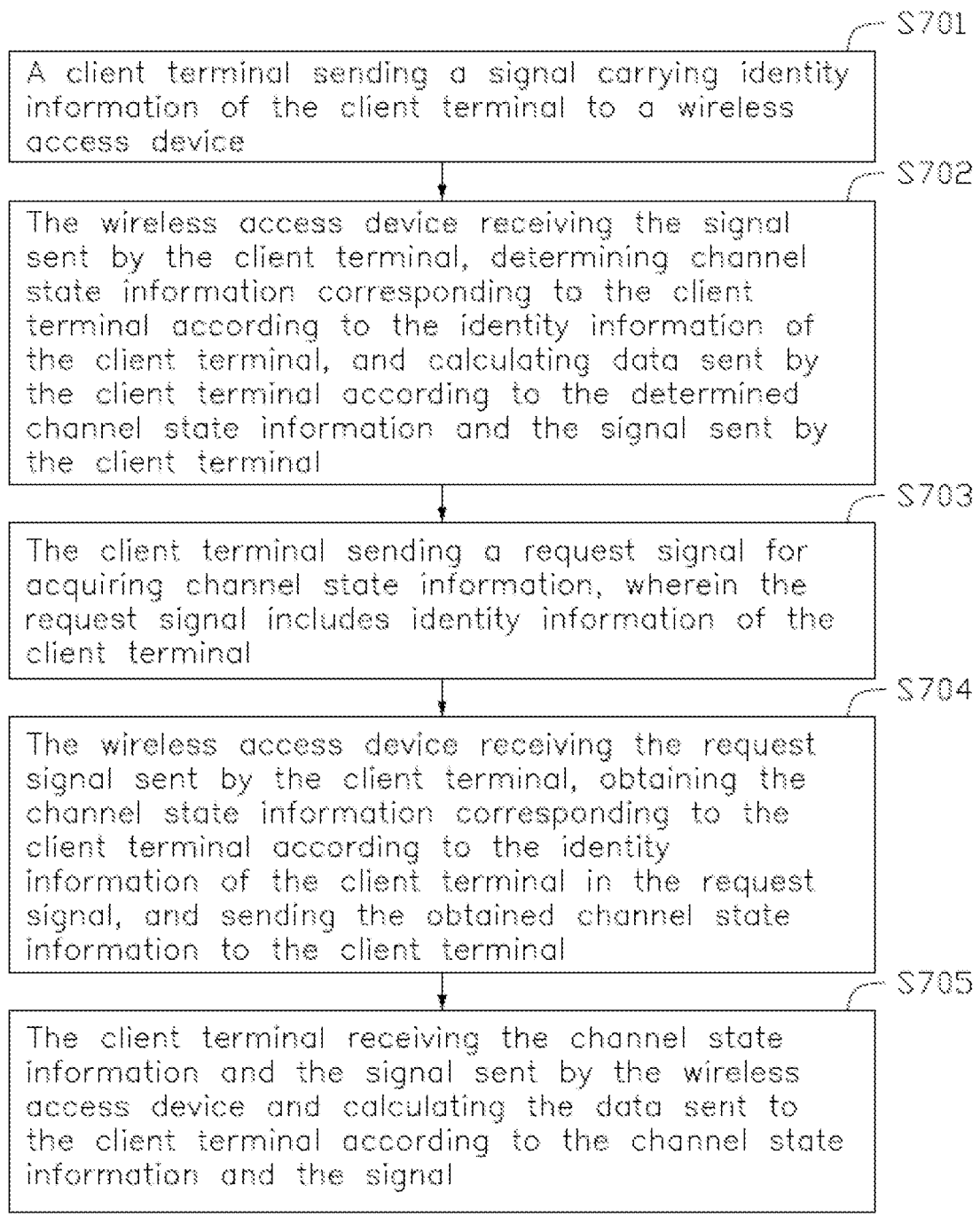
FIG. 7 is a flowchart of a method for improving an overall transmission rate of a mesh network.

FIG. 7 shows a flowchart of a method for improving an overall transmission rate of a mesh network 10. The mesh network 10 includes a wireless access device 1 and a client terminal 2 communicatively coupled to the wireless access device 1. The order of blocks in the flowchart may be changed according to different requirements, and some blocks may be omitted or combined.

At block S701, the client terminal 2 sends a signal carrying identity information of the client terminal 2 to the wireless access device 1.

In one embodiment, the client terminal 2 sends a signal carrying the identity information of the client terminal 2 to the wireless access device 1 through the second antenna 21. In one embodiment, the identity information of the client terminal 2 may be a unique number of the client terminal 2, and the unique number may be composed of characters such as letters or numbers.

At block S702, the wireless access device 1 receives, via the first antenna 11, a signal sent by the client terminal 2, determines channel state information (CSI) corresponding to the client terminal 2 according to the identity information of the client terminal 2 in the signal, and calculates data sent by each client terminal 2 according to the determined channel state information and the signal sent by each client terminal 2. In one embodiment, the channel state information describes a attenuation factor of a transmission signal along a transmission path between the client terminal 2 and each of the first antennas 11 of the wireless access device 1.

FIG. 3 shows a schematic diagram of a signal sent by the wireless access device 1 to the client terminal 2. In one embodiment, the wireless access device 1 includes two first antennas 11, each of which is communicatively coupled to two client terminals 2. For convenience of description, the two first antennas 11 are respectively referred to as a first antenna T1 and a first antenna T2, and the two client terminals 2 are respectively referred to as a client terminal A and a client terminal B. In one embodiment, both the client terminal A and the client terminal B can send a signal to the wireless access device 1, and the wireless access device 1 receives the signals sent by the client terminal A and the client terminal B through the first antenna T1 and the first antenna T2. The data sent by the client terminal A to the wireless access device 1 is set as x, and the data sent by the client terminal B to the wireless access device 1 is set as y. The signal received by the first antenna T1 from the client terminal A and the client terminal B is set as S1, and the signal received by the first antenna T2 from the client terminal A and the client terminal B is set as S2. The channel state information corresponding to the client terminal A is determined, with a driver in the wireless access device 1, as a vector $$h_1 = \begin{bmatrix} h_{A1} \\ह_{A2} \end{bmatrix}$$

according to the identity information in the signal sent by the client terminal A, wherein $h_{A1}$ is the attenuation factor of a transmission signal along a transmission path between the client terminal A and the first antenna T1, and $h_{A2}$ is the attenuation factor of a transmission signal along a transmission path between the client terminal A and the first antenna T2. The channel state information corresponding to the client terminal B is further determined, with the driver in the wireless access device 1, as a vector $$h_2 = \begin{bmatrix} h_{B1} \\ h_{B2} \end{bmatrix}$$

according to the identity information in the signal sent by the client terminal B, wherein $h_{B1}$ is the attenuation factor of a transmission signal along a transmission path between the client terminal B and the first antenna T1, and $h_{B2}$ is the attenuation factor of a transmission signal along a transmission path between the client terminal B and the first antenna T2.

The data x sent by the client terminal A and the data y sent by the client terminal B are calculated, according to the determined channel state information $$h_1 = \begin{bmatrix} h_{A1} \\ h_{A2} \end{bmatrix} \text{ and } h_2 = \begin{bmatrix} h_{B1} \\ h_{B2} \end{bmatrix}$$

and the signals S1 and S2 received by the first antennas T1 and T2, according to the equation $$\begin{cases} h_{A1} \cdot x + h_{B1} \cdot y = S1 \\ h_{A2} \cdot x + h_{B2} \cdot y = S2 \end{cases}.$$

In this way, the wireless access device 1 receives the data synchronously transmitted by the client terminal A and the client terminal B, thereby implementing uplink synchronous transmission of the wireless access device 1.

At block S703, the client terminal 2 sends a request signal for acquiring channel state information, wherein the request signal includes identity information of the client terminal 2.

In one embodiment, the request signal includes the identity information of the client terminal 2. The request signal is sent through the second antenna 21 to the wireless access device 1.

At block S704, the wireless access device 1 receives the request signal sent by the client terminal 2, obtains the corresponding channel state information corresponding to the client terminal 2 according to the identity information of the client terminal 2 in the request signal, and sends the obtained channel state information to the client terminal 2.

In one embodiment, the channel state information corresponding to the client terminal 2 is acquired by the driver in the wireless access device 1.

At block S705, the client terminal 2 receives the channel state information sent by the wireless access device 1 and the signal sent by the wireless access device 1, and calculates the data sent by the first antenna 11 to the client terminal 2 according to the channel state information and the signal.

FIG. 4 shows a schematic diagram of a wireless access device 1 transmitting a signal to a client terminal 2. In one embodiment, the wireless access device 1 includes two first antennas 11, each of which is in communication with two client terminals 2, and each client terminal 2 includes two second antennas 21. The data transmitted by the wireless access device 1 through the two first antennas 11 is respectively received by the two second antennas 21 of each client terminal 2.

For convenience of description, the two first antennas 11 are respectively referred to as a first antenna T1 and a first antenna T2, and the two client terminals 2 are respectively referred to as client terminal A and client terminal B. The two second antennas 21 are respectively referred to as a second antenna T3 and a second antenna T4. In one embodiment, the wireless access device 1 transmits data to the client terminal A and the client terminal B through the first antenna T1 and the first antenna T2, and the client terminal A and the client terminal B each receive the data through the second antenna T3 and the second antenna T4. Data f sent by the first antenna T1 to the client terminal A and the client terminal B is set as a1 and a2, respectively, and data sent by the second antenna T2 to the client terminal A and the client terminal B is set as b1 and b2, respectively. A signal received from the wireless access device 1 by the second antenna T3 of the client terminal A is set as S3, a signal received from the wireless access device 1 by the second antenna T4 of the client terminal A is set as S4, a signal received from the wireless access device 1 by the second antenna T3 of the client terminal B is set as S5, and a signal received from the wireless access device 1 by the second antenna T4 of the client terminal B is set as S6.

The channel state information corresponding to the client terminal A is determined, with a driver in the wireless access device 1, as a vector $$h_3 = \begin{bmatrix} h_{A3}, h_{A5} \\ h_{A4}, h_{A6} \end{bmatrix}$$

according to the identity information in the signal sent by the client terminal A, wherein $h_{A3}$ is the attenuation factor of a transmission signal along a transmission path between the second antenna T3 of the client terminal A and the first antenna T1, $h_{A4}$ is the attenuation factor of a transmission signal along a transmission path between the second antenna T3 of the client terminal A and the first antenna T2, $h_{A5}$ is the attenuation factor of a transmission signal along a transmission path between the second antenna T4 of the client terminal A and the first antenna T1, and $h_{A6}$ is the attenuation factor of a transmission signal along a transmission path between the second antenna T4 of the client terminal A and the first antenna T2.

The channel state information corresponding to the client terminal B is further determined, with the driver in the wireless access device 1, as a vector $$h_4 = \begin{bmatrix} h_{B3}, h_{B5} \\ h_{B4}, h_{B6} \end{bmatrix}$$

according to the identity information in the signal sent by the client terminal B, wherein $h_{B3}$ is the attenuation factor of a transmission signal along a transmission path between the second antenna T3 of the client terminal B and the first antenna T1, $h_{B4}$ is the attenuation factor of a transmission signal along a transmission path between the second antenna T3 of the client terminal B and the first antenna T2, $h_{B5}$ is the attenuation factor of a transmission signal along a transmission path between the second antenna T4 of the client terminal B and the first antenna T1, and $h_{B6}$ is the attenuation factor of a transmission signal along a transmission path between the second antenna T4 of the client terminal B and the first antenna T2.

The client terminal A receives the channel state information $$h_3 = \begin{bmatrix} h_{A3}, h_{A5} \\ h_{A4}, h_{A6} \end{bmatrix}$$

sent by the wireless access device 1 and the signals S3, S4 sent by the wireless access device 1 to the second antennas T3, T4 of the client terminal A and calculates the data a1 sent by the first antenna T1 to the client terminal A and the data b1 sent by the first antenna T2 to the client terminal A according to the equations $$\begin{cases} h_{A3} \cdot a_1 + h_{A4} \cdot b_1 = S3 \\ h_{A5} \cdot a_1 + h_{A6} \cdot b_1 = S4 \end{cases}.$$

The client terminal B receives the channel state information $$h_4 = \begin{bmatrix} h_{B3}, h_{B5} \\ h_{B4}, h_{B6} \end{bmatrix}$$

sent by the wireless access device 1 and the signals S5, S6 sent by the wireless access device 1 to the second antennas T3, T4 of the client terminal B and calculates the data a2 sent by the first antenna T1 to the client terminal B and the data b2 sent by the first antenna T2 to the client terminal B according to the equations $$\begin{cases} h_{B3} \cdot a_2 + h_{B4} \cdot b_2 = S5 \\ h_{B5} \cdot a_2 + h_{B6} \cdot b_2 = S6 \end{cases}.$$

In this way, the wireless access device 1 transmits the data synchronously to the client terminal A and the client terminal B, thereby implementing downlink synchronous transmission of the wireless access device 1.

In one embodiment, after block S705, the method further includes the following.

The client terminal 2 determines the wireless access device 1 that establishes a communication connection with the client terminal 2 as a target device. The client terminal 2 further detects whether the client terminal 2 is within a communication range of another wireless access device 1. If the client terminal 2 is within a communication range of another wireless access device 1, the another wireless access device 1 is determined as an interference device.

When an interference device is present, the client terminal 2 acquires channel state information sent by the target device, monitors channel state information sent by the interference device, and calculates a precoding matrix according to the channel state information sent by the target device and the channel state information sent by the interference device. The client terminal 2 performs diversity processing on the signal sent to the target device according to the precoding matrix to determine a first beam sent by the client terminal 2 to the target device, performs null processing on the signal sent to the interference device according to the precoding matrix to determine a second beam sent by the client terminal 2 to the interference device, and controls the client terminal 2 to send a signal to the target device through the first beam and send a signal to the interference device through the second beam to prevent the interference device from receiving interference from signals sent by the client terminal 2.

In one embodiment, the client terminal 2 calculates the precoding matrix according to the channel state information sent by the target device and the channel state information sent by the interference device by determining a first channel state vector according to the channel state information sent by the interference device, calculating a null space of the first channel state vector, determining a second channel state vector according to the channel state information sent by the target device, and projecting the second channel state vector in the null space to obtain the precoding matrix.

When the interference device is not present, the client terminal 2 acquires the channel state information sent by the target device, calculates a precoding matrix according to the channel state information sent by the target device, performs diversity processing on the signal sent to the target device according to the precoding matrix to determine a first beam transmitted by the client terminal 2 to the target device, and controls the client terminal 2 to send the signal through the first beam to the target device.

In one embodiment, the mesh network 100 includes a plurality of wireless access devices 1, each of which is in communication with at least one client terminal 2. The plurality of wireless access devices 1 are in communication with each other. The client terminal 2 sends an information transmission request of the client terminal 2 to each wireless access device 1. The wireless access device 1 receives the information transmission request sent by the client terminal 2 and determines a transmission plan for information transmission between the wireless access device 1 and the client terminal 2 according to the information transmission request. The wireless access device 1 receives the transmission plans from the other wireless access devices 1 for information transmission between the other wireless access devices 1 and the client terminals 2 and sorts the transmission plans of all the wireless access devices 1 in the mesh network 100. The wireless access device 1 further sends the transmission plan of all the wireless access devices 1 in the mesh network 100 to the client terminals 2. In one embodiment, the transmission plan includes a relationship between the wireless access devices 1 and the client terminals 2 and a time schedule for the client terminals 2 or the wireless access devices 1 to perform information transmission.

After receiving the transmission plan of all the wireless access devices 1 in the mesh network 100, the client terminal 2 determines a target device communicatively coupled to the client terminal 2 according to the transmission plans and determines whether the client terminal 2 is within a communication range of another wireless communication device 1 besides the target device. If the client terminal 2 is within a communication range of another wireless communication device 1 besides the target device, the client terminal 2 determines the another wireless communication device 1 as an interference device.

The method further includes the following after block S705.

The client terminal 2 performs information transmission with the wireless access devices 1 according to the transmission plans of all the wireless access devices 1 in the mesh network 100. In one embodiment, since the wireless access device 1 transmits the sorted transmission plans of all the wireless access devices 1 in the mesh network 100 to the client terminal 2 coupled to the wireless access device 1, the client terminal 2 performs information transmission with the wireless access device 1 according to the transmission plan sent by the wireless access device 1. In one embodiment, the client terminal 2 further determines, according to the transmission plan sent by the wireless access device 1, a time when the client terminal 2 and the wireless access device 1 perform information transmission, and a time when no information is transmitted, and sleeps during the time when the information is not transmitted, thereby achieving the effect of saving power.

The method further includes the following after block S705.

The wireless access device 1 allocates the number of client terminals 2 connected to the wireless access device 1 in the mesh network 100 according to a preset mechanism.

For convenience of description, in the present embodiment, a wireless access device 1 in the mesh network 100 is referred to as a first wireless access device, and the wireless access devices 1 in the mesh network 100 other than the first wireless access device are referred to as second wireless access devices. In one embodiment, the preset mechanism is to evenly allocate the number of client terminals 2 connected to the wireless access devices 1 in the mesh network 100. Specifically, the wireless access device 1 establishes a first connection list of the client terminals 2 that are communicatively coupled to the first wireless access device, and establishes a first detection list of the client terminals 2 that are not communicatively coupled to the first wireless access device but are within a communication range of the first wireless access device. The wireless access device 1 further establishes a second connection list of the client terminals 2 that are communicatively coupled to the second wireless access device, and establishes a second detection list of the client terminals 2 that are not communicatively coupled to the second wireless access device but are within a communication range of the second wireless access device. The wireless access device 1 determines whether the numbers of the client terminals 2 in the first connection list and in the second connection list are the same. When it is determined that the numbers of the client terminals 2 in the first connection list and in the second connection list are different, and the number of the client terminals 2 in the first connection list is greater than the number of the client terminals 2 in the second connection list, the wireless access device 1 filters out the client terminal 2 that are included simultaneously in the first connection list and in the second detection list as target client terminals and controls the first wireless access device to open an access control list (ACL) to disconnect communication with the target client terminals. The wireless access device 1 further controls the second wireless access device to open an access control list to connect the second wireless access device with the target client terminals.

In one embodiment, the wireless access device 1 determines the number of target client terminals that are filtered out. When the number of target client terminals exceeds one, the wireless access device 1 calculates a score of each target client terminal according to an information transmission rate between each target client terminal and the first wireless access device and according to a signal strength of each target client terminal acquired by the second wireless access device. The target client terminal with the highest score is set as a target client terminal to be allocated, the first wireless access device is controlled to open the access control list to disconnect the target client terminal to be allocated, and the second wireless access device is controlled to open the access control list to connect the second wireless access device to the target client terminal to be allocated.

In one embodiment, the wireless access device 1 calculates a score of each target client terminal by first grouping the target client terminals into target client terminals to be scored and target client terminals not to be scored. A score of each target client terminal not to be scored is determined according to an information transmission rate between the target client terminal not to be scored and the first wireless access device. Then, a score of each target client terminal to be scored is determined according to a signal strength of the target client terminal to be scored acquired by the second wireless access device. Then, the score of each target client terminal not to be scored is added to the score of each target client terminal to be scored to obtain a score of the target client terminal to be scored.

FIG. 5 shows a schematic diagram of a first relationship table L1, which is stored in the wireless access device 1. The first relationship table L1 defines a relationship between an information transmission rate of the client terminal 2 with the wireless access device 1 and a score. In one embodiment, the wireless access device 1 searches the first relationship table L1 according to the information transmission rate between each target client terminal not to be scored and the first wireless access device, and determines the score corresponding to the information transmission rate.

FIG. 6 shows a schematic diagram of a second relationship table L2, which is stored in the wireless access device 1. The second relationship table L2 defines a relationship between the signal strength of the client terminal 2 and a score. In one embodiment, the wireless access device 1 searches the second relationship table L2 according to the signal strength of the target client terminal to be scored acquired by the second wireless access device and determines the score of the target client terminal to be scored corresponding to the signal strength.

In another embodiment, the preset mechanism is to assign the client terminal 2 having a high priority to the wireless access device 1 in the mesh network 100 being connected to a least amount of client terminals 2. In one embodiment, the priority of the client terminals 2 can be set in advance.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A wireless access device comprising:
   a first antenna communicatively coupling the wireless access device to at least one client terminal; and
   a processor configured for:
   receiving a signal sent by the at least one client terminal;
   determining channel state information of the at least one client terminal according to identity information of the client terminal in the signal;
   calculating data sent by the at least one client terminal to the wireless access device according to the channel state information and the signal of the at least one client terminal;
   allocating a number of client terminals connected to the wireless access device in a mesh network according to a preset mechanism, wherein the mesh network comprises a plurality of wireless access devices and a plurality of client terminals, each of the wireless access devices being communicatively coupled to at least one of the client terminals;

establishing a first connection list of the client terminals that are communicatively coupled to a first wireless access device, and establishing a first detection list of the client terminals that are not communicatively coupled to the first wireless access device but are within a communication range of the first wireless access device;

establishing a second connection list of the client terminals that are communicatively coupled to a second wireless access device, and establishes a second detection list of the client terminals that are not communicatively coupled to the second wireless access device but are within a communication range of the second wireless access device;

determining whether the numbers of the client terminals in the first connection list and in the second connection list are the same, wherein if the numbers of the client terminals in the first connection list and in the second connection list are different, and a number of the client terminals in the first connection list is greater than a number of the client terminals in the second connection list, filtering out the client terminal that are included simultaneously in the first connection list and in the second detection list as target client terminals, and controlling the first wireless access device to open an access control list to disconnect communication with the target client terminals, and controlling the second wireless access device to open an access control list to connect the second wireless access device with the target client terminals.

2. The wireless access device of claim 1, wherein the processor is further configured for:

receiving a request signal carrying the identity information sent by the client terminal;

obtaining the corresponding channel state information according to the identity information of the client terminal in the request signal; and sending the obtained channel state information to the client terminal.

3. The wireless access device of claim 1, wherein the processor is further configured for:

controlling the wireless access device to receive an information transmission request sent by the client terminal and determine a transmission plan for information transmission between the wireless access device and the client terminal according to the information transmission request;

receiving transmission plans from other wireless access devices; and sending the transmission plans of all the wireless access devices to the client terminal to cause the client terminal to perform information transmission with the wireless access device according to the transmission plan.

4. The wireless access device of claim 1, wherein the processor is further configured for:

determining a number of target client terminals that are filtered out;

calculating a score of each of the target client terminals according to an information transmission rate between each of the target client terminals and the first wireless access device and according to a signal strength of each of the target client terminals acquired by the second wireless access device;

setting the target client terminal with the highest score as a target client terminal to be allocated, controlling the first wireless access device to open the access control list to disconnect the target client terminal to be allocated, and controlling the second wireless access device to open the access control list to connect the second wireless access device to the target client terminal to be allocated.

5. The wireless access device of claim 1, wherein the processor is further configured for:

assigning the client terminal having a high priority to the wireless access device in the mesh network being connected to a least amount of client terminals.

6. A wireless access device comprising:

a first antenna communicatively coupling the wireless access device to at least one client terminal; and a processor configured for:

receiving a signal sent by the at least one client terminal;

allocating a number of client terminals connected to the wireless access device in a mesh network according to a preset mechanism, wherein the mesh network comprises a plurality of wireless access devices and a plurality of client terminals, each of the wireless access devices being communicatively coupled to at least one of the client terminals;

assigning the client terminal having a high priority to the wireless access device in the mesh network being connected to a least amount of client terminals;

controlling the wireless access device to receive an information transmission request sent by the client terminal and determine a transmission plan for information transmission between the wireless access device and the client terminal according to the information transmission request;

receiving transmission plans from other wireless access devices; and sending the transmission plans of all the wireless access devices to the client terminal to cause the client terminal to perform information transmission with the wireless access device according to the transmission plan.

7. The wireless access device of claim 6, wherein the processor is further configured for:

determining channel state information of the at least one client terminal according to identity information of the client terminal in the signal;

calculating data sent by the at least one client terminal to the wireless access device according to the channel state information and the signal of the at least one client terminal;

receiving a request signal carrying the identity information sent by the client terminal;

obtaining the corresponding channel state information according to the identity information of the client terminal in the request signal; and sending the obtained channel state information to the client terminal.

8. The wireless access device of claim 6, wherein the processor is further configured for:

establishing a first connection list of the client terminals that are communicatively coupled to a first wireless access device, and establishing a first detection list of the client terminals that are not communicatively coupled to the first wireless access device but are within a communication range of the first wireless access device;

establishing a second connection list of the client terminals that are communicatively coupled to a second wireless access device, and establishes a second detection list of the client terminals that are not communicatively coupled to the second wireless access device but are within a communication range of the second wireless access device;

determining whether the numbers of the client terminals in the first connection list and in the second connection list are the same, wherein if the numbers of the client terminals in the first connection list and in the second connection list are different, and a number of the client terminals in the first connection list is greater than a number of the client terminals in the second connection list, filtering out the client terminal that are included simultaneously in the first connection list and in the second detection list as target client terminals, and controlling the first wireless access device to open an access control list to disconnect communication with the target client terminals, and controlling the second wireless access device to open an access control list to connect the second wireless access device with the target client terminals.

9. The wireless access device of claim 6, wherein the processor is further configured for:

determining a number of target client terminals that are filtered out;

calculating a score of each of the target client terminals according to an information transmission rate between each of the target client terminals and the first wireless access device and according to a signal strength of each of the target client terminals acquired by the second wireless access device;

setting the target client terminal with the highest score as a target client terminal to be allocated, controlling the first wireless access device to open the access control list to disconnect the target client terminal to be allocated, and controlling the second wireless access device to open the access control list to connect the second wireless access device to the target client terminal to be allocated.

* * * * *